(12) United States Patent
Bumb et al.

(10) Patent No.: US 10,434,462 B2
(45) Date of Patent: Oct. 8, 2019

(54) SOLVENT AND METHOD FOR REMOVING ACID GASES FROM A GASEOUS MIXTURE

(71) Applicant: CARBON CLEAN SOLUTIONS LIMITED, Reading (GB)

(72) Inventors: Prateek Bumb, London (GB); Gopi Kiran Neeliesetty, Mumbai (IN)

( * ) Notice: Subject to any disclaimer, the term of this patent is extended or adjusted under 35 U.S.C. 154(b) by 0 days.

(21) Appl. No.: 15/545,642

(22) PCT Filed: Jan. 22, 2016

(86) PCT No.: PCT/IB2016/000112
§ 371 (c)(1),
(2) Date: Jul. 21, 2017

(87) PCT Pub. No.: WO2016/116815
PCT Pub. Date: Jul. 28, 2016

(65) Prior Publication Data
US 2018/0001255 A1  Jan. 4, 2018

(51) Int. Cl.
*B01D 53/14* (2006.01)
*C10L 3/10* (2006.01)

(52) U.S. Cl.
CPC ..... *B01D 53/1493* (2013.01); *B01D 53/1425* (2013.01); *B01D 53/1462* (2013.01); *B01D 53/1487* (2013.01); *C10L 3/102* (2013.01); *C10L 3/104* (2013.01); *B01D 2251/306* (2013.01); *B01D 2251/606* (2013.01); *B01D 2252/2023* (2013.01); *B01D 2252/2056* (2013.01); *B01D 2252/20426* (2013.01); *B01D 2252/20431* (2013.01); *B01D 2252/20447* (2013.01); *B01D 2252/20489* (2013.01); *B01D 2252/50* (2013.01); *B01D 2252/504* (2013.01); *B01D 2252/602* (2013.01); *B01D 2256/16* (2013.01); *B01D 2256/20* (2013.01); *B01D 2256/245* (2013.01); *B01D 2257/306* (2013.01); *B01D 2257/308* (2013.01); *B01D 2257/702* (2013.01); *B01D 2257/80* (2013.01); *C10L 2290/12* (2013.01); *C10L 2290/541* (2013.01); *Y02C 10/04* (2013.01); *Y02C 10/06* (2013.01)

(58) Field of Classification Search
None
See application file for complete search history.

(56) References Cited

U.S. PATENT DOCUMENTS

2010/0105551 A1* 4/2010 Kim ............... B01D 53/1475
502/401

* cited by examiner

*Primary Examiner* — Tam M Nguyen
(74) *Attorney, Agent, or Firm* — Lewis Brisbois Bisgaard & Smith LLP; Nigamnarayan Acharya

(57) ABSTRACT

A solvent and method for removing carbon dioxide from a gaseous mixture flow with high carbon dioxide partial pressures are disclosed. The solvent includes a secondary or tertiary amine, an amine activator, a physical solvent (e.g., thioalkanol), and a carbonate buffer. The solvent contains less than about 60% by weight of water and is in a single liquid phase.

13 Claims, 3 Drawing Sheets

SOLVENT AND METHOD FOR REMOVING ACID GASES FROM A GASEOUS MIXTURE

CROSS REFERENCE TO RELATED APPLICATION

This application is a U.S. national stage filing under 35 U.S.C. Section 371 of International Application No. PCT/IB2016/000112, filed Jan. 22, 2016 and claims priority to U.S. Provisional Patent Application Ser. No. 62/106,424, filed Jan. 22, 2015, which is both incorporated by reference.

FIELD OF TECHNOLOGY

This disclosure relates generally to an absorption solvent and, more particularly, to an absorption solvent for removing acid gases such as hydrogen sulphide and carbon dioxide with high partial pressures.

BACKGROUND

Acidic natural gases represent about 50% of the remaining gas reserves in the world and the specifications relating to the sulphur content of these gases are more and more serious. The purification of gaseous mixtures, and in particular of hydrocarbon gaseous mixtures such as natural gas, which consists primarily of methane, or of synthesis gas, in order to remove contaminants and impurities from them is a common operation in industry. These impurities and contaminants are in particular the "acidic gases" such as for example carbon dioxide (CO2) and hydrogen sulphide (H2S); sulphur-containing compounds other than hydrogen sulphide (H2S) such as for example carbonyl sulphide (COS) and the mercaptans (R—SH, where R is an alkyl group); water, and certain hydrocarbons.

Generally, a solvent has its own advantages and disadvantages as to features such as loading capacity, kinetics, regeneration energy, selectivity, stability, corrosively, and so on. This disclosure is directed to an improved solvent with unexpected properties.

SUMMARY

This disclosure relates to a solvent composition for partially or completely removing gases from a gas stream by washing the gaseous stream with a solution containing a combination of physical and chemical solvents. The gases may be carbon dioxide, hydrogen sulphide, and/or COS, Mercaptans (R—SH). This disclosure further relates to a process carried out in the presence of an alkanol amine compound in an amount between 30 to 40 wt. %, an activator to catalyze the reaction in an amount between 2 to 10 wt. %, a physical solvent (e.g., thioalkanol or thiodiglycol) in an amount ranging between 10 to 25 wt %, and a carbonate buffer for use in an acid gas cleaning system. Additionally, this disclosure relates to an absorbent liquid, which has a more optimal viscosity and load carrying capacity, that can be used in a purification process for removal of acid gases.

BRIEF DESCRIPTION OF THE DRAWINGS

The features, nature, and advantages of the present disclosure will become more apparent from the detailed description set forth below when taken in conjunction with the drawings in which like reference characters identify corresponding aspects throughout.

DETAILED DESCRIPTION

Figure 1:
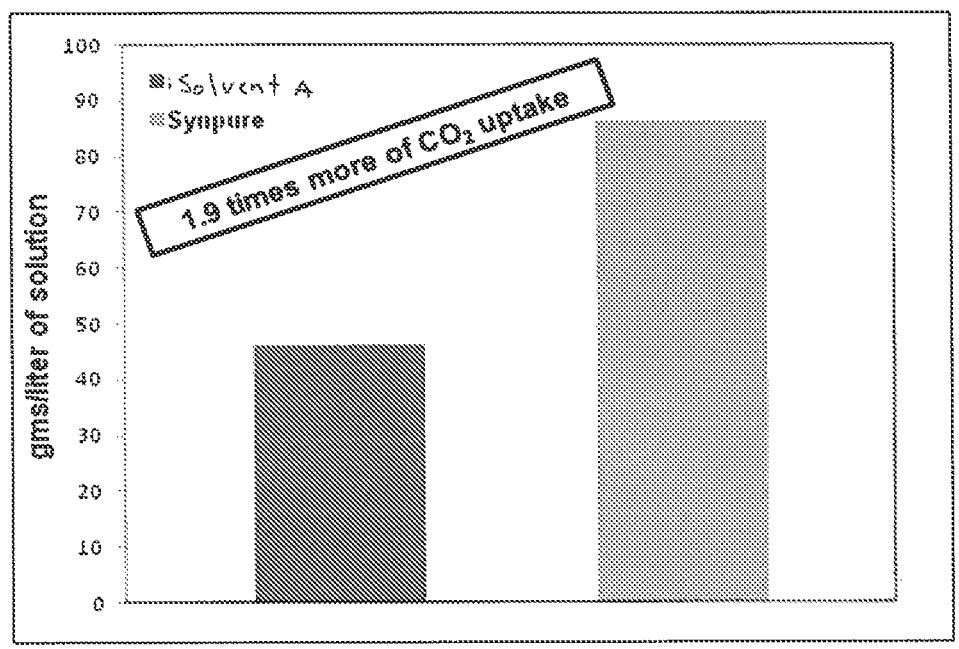
FIG. 1 is a graphical representation illustrating net capacity data of exemplary solvents according to the present disclosure.

This disclosure includes a solvent and process for removing acid gases, and optionally hydrogen sulphide and/or COS, methyl mercaptan/methane thiols, from a gas stream or gaseous mixture by washing the gas stream with an aqueous solution containing water, thiodiglycol, a secondary or tertiary alkanol amine, amine activator (e.g., amino ethyl piperazine) and potassium carbonate. The disclosure relates to solvents to be used in the above process that have reduced viscosity. The viscosity of a solvent is an important physicochemical property required for fluid transport in chemical processes. The specific densities and viscosities of the solvent has a significant role in the process design and operation of a gas treating process plant. Generally, solvents with lower viscosity offer higher acid gas absorption kinetic rates.

In one specific embodiments, the solvents include a tertiary amine group, amino ethyl piperazine, thiodiglycol and a carbonate buffer salt. The use of the amine activator such as amino ethyl piperazine can improve the performance of the acid gas cleaning system. For reducing the overall vapor pressure of the absorbent system and for increasing the active amine site in the separation system, a potassium carbonate buffer may act in a specific role. Further, for increasing the $CO_2$ intake by the solvent at high pressures, a thioalkanol may be included in the solvent.

In another specific embodiment, the solvent for removing acid gases from a gaseous mixture has a secondary or tertiary amine that is between about 30 wt. % and about 45 wt. %, an amine promoter that is between about 5 wt. % and about 10 wt. %, thioalkanol that is between about 10% and 25% wt. %, a carbonate buffer that is between 0.1 and 2.0 wt. %. The solvent contains less than about 60 wt. % by weight of water, is in a single liquid phase, and has a viscosity of less than 11 centipoise (cP) at 40° C.

In a particularly significant embodiment, the solvent for removing acid gases from a gaseous mixture comprises a tertiary amine that is between about 32 wt. %, N-aminoethylpiperazine (AEP) that is between about 8 wt. %, thiodiglycol that is between about 20% wt. %, a K2CO3 buffer, wherein the buffer is about 0.2 wt. %, and the solvent containing less than about 60 wt. % by weight of water. The solvent is in a single liquid phase and the solvent has a viscosity of less than 11 cP at 40° C. with a CO2 concentration less than 2.2M. The solvent can have viscosity between 7 and 9 cP at 40 C with substantially no CO2 concentration. In other examples, the solvent also a viscosity between 10 cP and 11 cP at 40° C. and with less than 2.5M CO2.

A mixture for absorbing the gases disclosed herein from a gas stream includes a thiodiglycol physical solvent and the tertiary amine Methyl Diethanol Amine (MDEA). This mixture demonstrates an absorption capacity and selectivity suitable for acid gas absorption. Further, the performance of this mixture is beneficial at a high partial pressure of CO2, such as between 5 bar and 70 bar, for example. The liquid/gas ratio of the solvent system disclosed herein may be manipulated, for example at high pressures and/or deep carbon dioxide removal. Moreover, addition of an activator with carbonate buffer may be utilized. For example, the addition of an amino ethyl piperazine (AEP) and potassium carbonate results in improved kinetics of the system as compared to systems currently known in the art, thereby resulting in improvement to the liquid/gas ratio and reduction in the vapor pressure of the solvent system. Further, a deep removal of carbon dioxide may be obtained.

Adding a suitable activator compound, for example in relatively small amounts, allows for more carbon dioxide to be flashed at relatively high pressure as compared to similar, aqueous chemical absorbents known in the art. Carbamates may form at high solvent loadings. These carbamates are insoluble in aqueous solution. Thus a limited amount of the activator Amino Ethyl Piperazine may be used with purely aqueous chemical solutions. However, such carbamate limitations do not occur in Thiodiglycol physical solvent mixtures. The present disclosure therefore provides a process for removing carbon dioxide, and optionally hydrogen sulphide and/or COS, from a gas stream by washing the gas stream with an aqueous solution containing tertiary amine MDEA, the physical solvent thiodiglycol, and the amine activator amino ethyl piperazine with buffer potassium salt.

In other embodiments, the solvent may include a tertiary amine having two ethyl groups that replace the hydrogen atoms of the amino group in MEA. Since there is no hydrogen atom attached to the nitrogen atom as is the case with MEA and DEA, the aforementioned carbamate reaction does not occur. The concentration of the amine compound may vary between 30% to 45% by weight. Further, the concentration of the amine compound may be between 30% and 38% by weight. Methyl diethanolamine (MDEA) may be the alkanolamine of the solvent. Apart from MDEA, other examples of alkanolamines that may be used in the process include triethanol amine (TEA) and triethylamine, for example.

The solvent may further include a second compound that acts as an activator. The concentration of the activator compound may vary between 5% and 10% by weight. Further, the concentration of the activator compound may be about 8% by weight. The reactive activator may be amino ethyl Piperazine, for example.

The solvent may also include thiodiglycol or thioalkanol to increase the net capacity of the solvent at high partial pressures of $CO_2$ and reduces the overall energy consumption of processes. The concentration of this physical compound may vary between 10% and 25% by weight. Moreover, this physical compound may have a concentration between 15% and 20% by weight. In other examples, the thiodiglycol or thioalkanol may be between 10 wt. % and 20 wt. %

Additionally, the solvent may include a fourth compound including a potassium buffer salt that reduces the overall vapor pressure of the absorbent system and that acts as a catalyst to provide the active amine site for the acid gas separation process.

The gases to be treated in the process disclosed herein may be a synthesis gas, obtained by, for example, (catalytic) partial oxidation and/or by steam methane reformation of hydrocarbons, e.g., methane, natural or associated gas, Naphtha, diesel and liquid residual fractions, gases originating from coal/biomass gasification, coke oven gases, refinery gases, hydrogen and hydrogen containing gases, and synthesis gas or natural gas. The process may be carried out at a temperature between 15 C and 90 C. Moreover, the process may be carried out between 25 C and 80 C. Moreover, the process may be carried out between 40 C and 65 C. The process may also be carried out at a pressure between 10 bar and 150 bar. Additionally, the process may be carried out at a pressure between 15 bar to 90 bar.

The process using the solvent may be carried out continuously through regeneration of the loaded solvent. Contact of the gas mixture with the absorbent solvent may be done through any means well known in the art. For example, it may be carried out in an absorption column having valve trays, bubble cab trays, baffles, and the like, and structured/random packing may also be applied. The amount of $CO_2$ removal may be optimized by changing the solvent/gas ratio. The solvent/gas ratio may be from 1.0 to 10 (w/w). The loaded solvent may contain, beside $CO_2$ and optionally $H_2S$ and/or COS, appreciable amounts of other compounds from the gas mixture to be purified, such as hydrocarbons, carbon monoxide, hydrogen, and so on. These (non-acid) compounds may be removed from the loaded solvent by flashing to a pressure higher than the sum of the partial pressure belonging to the $CO_2$ and optionally $H_2S$ and/or COS. In this scenario, small amounts of $CO_2$ and optionally $H_2S$ and COS are released from the solvent with the (non-acid) compounds. The loaded solvent may also be flashed in a second step to a pressure below the partial pressures of $CO_2$ and optionally H2S and COS at the prevailing temperature. This flashing may be carried out at a pressure between 1 bar and 15 bar. Moreover, this flashing may be carried out between 1 bar and 10 bar. Additionally, the flashing may occur at ambient pressure. After flashing, the loaded solvent may be regenerated at a relatively high temperature and at a pressure between 1 bar and 5 bar. Moreover, regeneration of the loaded solvent may occur between 1 bar to 3 bar. The regeneration may be carried out by heating, in a regeneration column, a temperature between 70 C and 150 C. The heating may be carried out with steam or hot oil. The lean absorbent solvent may be used again in the absorption stage. The lean solvent may be heat exchanged with the loaded solvent.

An absorber intercooling can be provided to maintain a constant temperature profile in the absorber. A stream of 10% to 70% volumetric flow from the bottom of the packing section in the absorber may be withdrawn, cooled, and sent to the top of the packing section. Moreover, a stream of 30% to 50% volumetric flow may be utilized.

The solvent may be able to remove $H_2S$, COS and mercapatans from the purification process and may be able to make the aforementioned gas useful for other applications not disclosed herein.

In certain specific embodiment, the solvent has MDEA that is between about 30 wt. % and 40 wt. %, thiodiglycol that is about 10 to 25 wt. %, AEP that is 5 to 10 wt. % and K2CO3 between 0.1 and 0.5 wt. %. In yet other embodiments, the solvent has MDEA is between about 30 and 38 wt. %, thiodiglycol is about 10 to 20 wt. %, AEP is 5 to 10% and K2CO3 is between 0.1 and 0.3 wt. %.

In another specific embodiment, the solvent has MDEA at about 32 wt. %, thidiglycol at about 20 wt. %, AEP at about 8 wt %, and a K2CO3 buffer at about 0.18 wt. %. In an example, the solvent may have a composition of 32 wt % MDEA, 8 wt % AEP, 0.2 wt % $K_2CO_3$, 20 wt % thiodiglycol, and the remainder water. Furthermore, the wt % of the composition components may have variances of 10%, 3%, and 1%, for example. In this embodiment, the viscosity of the solvent was less than 11 cP at 40° C. and with CO2 concentration less than 2.5M. When the solvent is unloaded, viscosity was about 7 and 9 cP at 40° C.

In yet other embodiment, the absorbent solvent contained the physical solvent thiodiglycol between 10 and 30 wt %, the tertiary amine MDEA between 20 and 40 wt %, the amine activator amino ethyl piperazine between 3 wt. % and 15 wt %, and the potassium carbonate buffer between 0.1 to 4 wt %, with the remainder of the solvent being water.

EXAMPLES

Example 1 (Comparative Example)

In this example, the acid gaseous mixture was treated with (a) an absorbent solution (labeled Solvent A) having water, MDEA, piperazine in the respective proportions of 60%, 35%, 5% by weight, respectively, and (b) an exemplary solvent (labeled Synpure) having MDEA of 32 wt. %, TDG of about 20%, AEP of about 8 wt. % and K2CO3 of about 0.2 or 0.18 wt. %.

Figure 2:
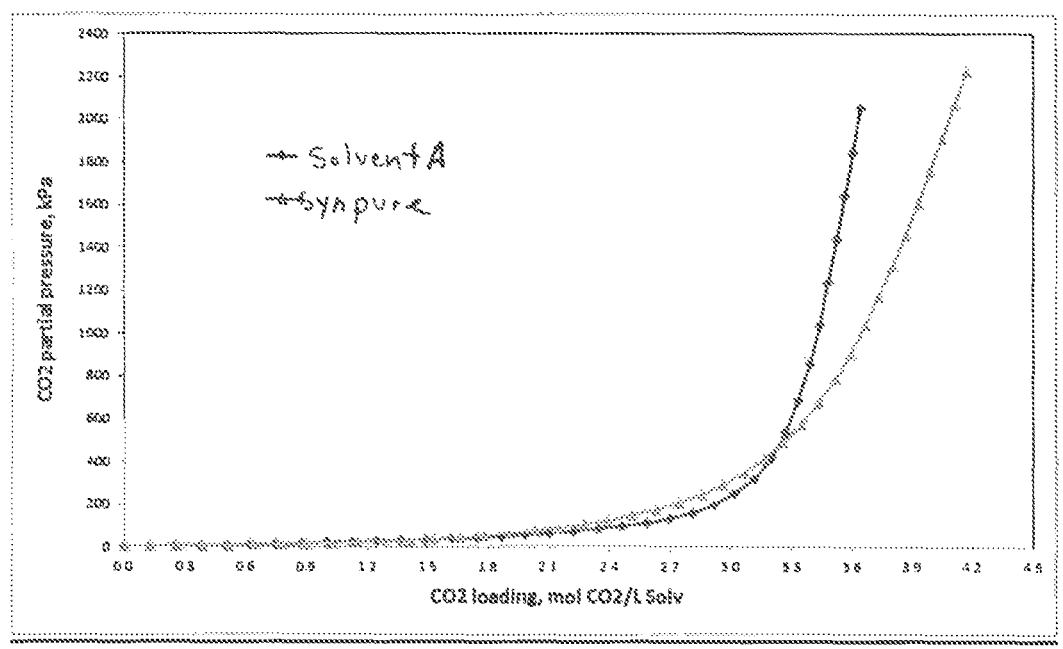
FIG. 2 is a graphical representation illustrating vapor-liquid equilibrium data at 40° C. of exemplary solvents according to the present disclosure.

FIGS. 1 and 2 are a graphical representation of the vapor-liquid equilibrium data at 40° C. of the absorbent solution and an exemplary absorption solution. The exemplary solution offers higher acid gas loading capacity. Further, it is necessary to provide an additional step for the removal of mecaptans for solvent, for example a step using molecular sieves which is not required for present invention. The solvent (labeled Synpure) makes it possible to reach the specifications for acidic acid in single step, namely below 2 and 50 ppm of $H_2S$ and $CO_2$ in the treated gas but also remove mercaptans below 5 ppm by volume. No additional treatment step was necessary to remove the mercaptans.

Examples 2 (Comparative Example)

Acid gaseous mixtures were treated with an absorbent solution of water, MDEA, HEP and TDG in respective proportions of (a) 30% Water, 42% MDEA, 8% HEP and 20% TDG by weight and (b) 37%, 35%, 8% and 20% by weight, respectively. These are Solvent 2 and 4, respectively. Solvents 1 and 3 are solvents are exemplary solvents having MDEA of about 32 wt. %, TDG of about 20%, AEP of about 8 wt. % and K2CO3 of about 0.2 or 0.18 wt. %.

Figure 3:
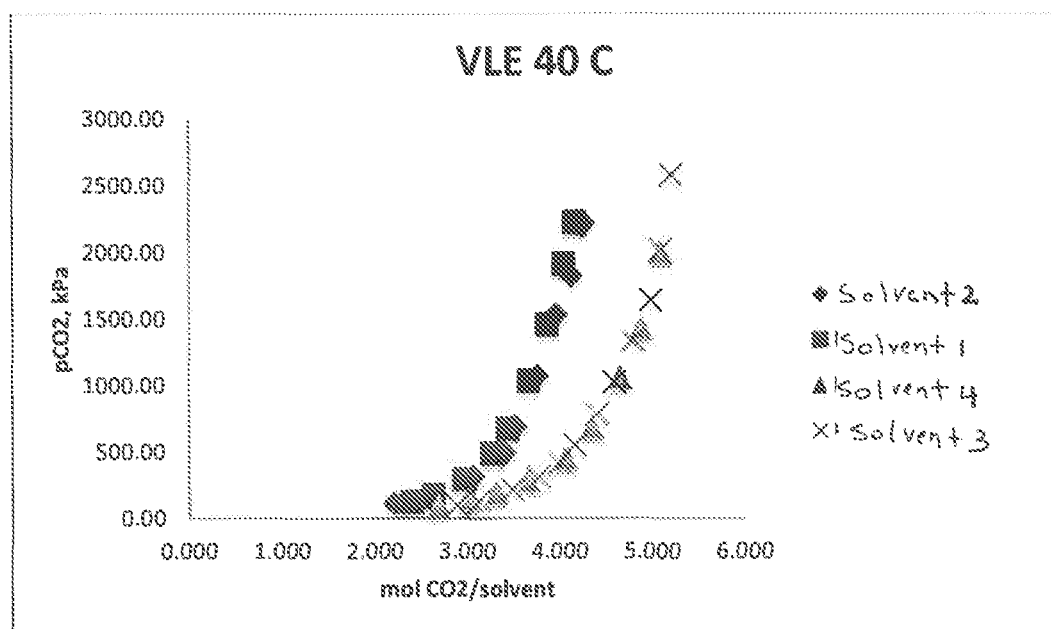
FIG. 3 is a graphical representation illustrating vapor-liquid equilibrium data at 40° C. of exemplary solvents according to the present disclosure.

FIG. 3 is a graphical representation illustrating Vapor Liquid Equilibrium data at 40 C of exemplary. The exemplary solvent and comparative solutions offering similar high acid gas loading capacity but differs significantly improvement in viscosity data at acid gas loading conditions.

|  | At 40 C., unloaded | | At 40 C., $CO_2$ loaded | | |
| --- | --- | --- | --- | --- | --- |
|  | Density, kg/m³ | Viscosity, cP | Density, kg/m³ | Viscosity, cP | $CO_2$ loading, M |
| Solvent 1 | 1061.2 | 7.056 | 1141.0 | 10.14 | 2.20 |
| Solvent 2 | 1069.9 | 9.680 | 1144.9 | 20.36 | 1.45 |
| Solvent 3 | 1061.0 | 8.735 | 1144.1 | 10.85 | 1.63 |
| Solvent 4 | 1071.9 | 12.810 | 1148.1 | 21.83 | 1.89 |

The viscosity of absorption solution is an important physicochemical property required for fluid transport in chemical processes. The specific properties density, viscosity plays a significant role in the process design and operation of a gas treating process plant. Generally, absorption solution with low viscosity offers high acid gas absorption kinetics rate of reaction.

The most significant factor in the CAPEX is the packing height in the absorber column. The packing height in the column is determined by the rate of reaction (kinetics) of $CO_2$ with the solvent mixture. Faster the rate of reaction lower is the packing height. So kinetics of $CO_2$ reaction with the solvent mixture plays a major role in determining the packing height.

According to the Stokes-Einstein correlation, the diffusivity coefficient ($D_{CO2}$) depends on the viscosity ($\mu_L$) and temperature (T) as per the following equation.

$$\frac{D_{CO2} * \mu_L}{T} = \text{Constant}$$

According to the above equation, the diffusivity of $CO_2$ in the liquid phase is inversely proportional to the liquid viscosity. So at higher viscosities the rate of absorption is very low and consequently will take extremely long time to reach equilibrium which in-turn increases the packing height of the columns. The rate of heat transfer reduces as viscosity increases. So high viscous liquids increases the heat-exchanger areas which in turn increases the CAPEX.

The significant parameters for the OPEX are thermal energy and electrical energy. Major electrical energy consists of the pumps used in the $CO_2$ capture process. As viscosity increases the friction drag on a pump impeller increases significantly and the additional electrical energy to overcome this drag reduces the pump efficiency.

When the pump efficiency reduces the power requirement increases as per the below equation $$P = \frac{Q * H * \rho * g}{\eta}$$

Where:
P is the pump power
Q is the volumetric flowrate of the liquid
H is the head developed by the pump
$\rho$ is the density of the liquid
g is the acceleration of gravity
$\eta$ is the pump efficiency High viscous solution described in prior art are expected to have 20%-25% higher cost associated with column packing height, cross-exchanger design and operation than solvents with lower viscosity absorption solvent as disclosed in this example.

Examples 3 (Comparative Example)

The presence of significant amount of hydrocarbons discourages the use of a physical solvent (e.g., thiodiglycol) in the acid gaseous mixture of $CO_2/H_2S$ capture. The physical solvent selected in Example 1 (labeled Exemplary Thiodiglycol) offers very low co-absorption as compared to the other physical solvents (e.g., DEG, NMP or PC).

| Solvent | $H_2S$ selectivity | $CO_2$ selectivity | $H_2S/CO_2$ selectivity | $CH_4$ absorption, wt % | Vapor Pressure, Pa |
| --- | --- | --- | --- | --- | --- |
| Diethylene Glycol (DEG) | 11.2 | 2 | 5.6 | 0.12 | 3.866 |
| Exemplary Thiodiglycol (TDG) | 10.6 | 1.2 | 8.8 | 0.17 | 1.133 |

-continued

| Solvent | H$_2$S se-lectivity | CO$_2$ selectivity | H$_2$S/CO$_2$ selectivity | CH$_4$ absorption, wt % | Vapor Pressure, Pa |
|---|---|---|---|---|---|
| N-Methyl Pyrrolidone (NMP) | 35.7 | 5.5 | 6.5 | 1.58 | 117.32 |
| Propylene Carbonate (PC) | 16.3 | 4.5 | 3.63 | 0.45 | 6.66 |

From the above table, the loss of hydrocarbon from the process system using the physical absorption solution (TDG) is lower compared to the major physical solvents that are currently being used. Thus, the loss of hydrocarbons from the process is low. Also, due to very lower vapor pressure the carryover of absorption solution into the vapor phase is low and thus reduces the cost of further treatment of the vapor streams.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions, and sub-combinations as are within their true spirit and scope.

What is claimed is:

1. A solvent for removing acid gases from a gaseous mixture consisting of:
   methyldiethanolamine that is between 30 wt. % and 32 wt. %,
   N-aminoethylpiperazine that is between 5 wt. % and about 10 wt. %,
   thiodiglycol that is between about 10% and 20% wt. %,
   a potassium carbonate buffer,
   wherein the buffer is between 0.1 and 2.0 wt. %, and the solvent containing less than about 55 wt. % by weight of water, wherein the solvent is in a single liquid phase and the solvent has a viscosity of less than 11 cP at 40 degree. C. in the present of less than 2.5M CO$_2$.

2. The solvent of claim 1, wherein the N-Aminoethylpiperazine is between 5 wt. % and 12 wt. % of the solvent and thiodiglycol is 20 wt. %.

3. The solvent of claim 1, wherein the N-Aminoethylpiperazine is about 8 wt. %; and thiodiglycol is 20 wt. %.

4. The solvent of claim 3, wherein methyl diethanolamine to is about 32 wt. % and the viscosity of the solvent is less than 11 cP at 40 C and about 7 to 9 cP at 40 C unloaded.

5. A process for removal of acid gases from a gaseous mixture comprising the steps of:
   obtaining a solvent consisting of methyl diethanolamine that is between 30 wt. % and 32 wt. % of the solvent, N-Aminoethylpiperazine that is between about 5 wt. % and about 10 wt. % of the solvent, thiodiglycol that is between about 10% and 20% wt. %, a carbonate buffer, wherein the buffer is between 0.1-2 wt. %, and the solvent containing less than about 60 wt. % by weight of water, the solvent having a temperature between about 30 C and about 65 C; and
   applying the solvent to a gaseous mixture comprising gases selected from the group consisting of carbon dioxide, mercapatans, hydrogen sulphide, and carbonyl sulphide;
   loading the solvent into a regeneration column with at least carbon dioxide/acid gas at a regeneration pressure between about 0 bar to about 5 bar and at a temperature between about 75.degree. C. and about 130 C.; and
   heating the gas absorbed solvent to a temperature between about 65 C and about 110 C.

6. The process of claim 5, further comprising the step of: hearing the solvent to a temperature between about 105 C and about 130 C.

7. The process of claim 5, comprising the step of: reducing a concentration to below 2 and 50 ppm of S and CO2 in the treated gas but also remove mercaptans below 5 ppm by volume.

8. The process of claim 5, further comprising the step of: reducing a concentration of carbon dioxide in the gaseous mixture to less than about 10 ppm.

9. The process of claim 5, wherein the gaseous mixture is a synthesis gas obtained from a process selected from the group consisting of a coal gasification process, a steam reforming process, and a direct reduced iron process comprising carbon monoxide, carbon dioxide, hydrogen sulfide, carbonyl sulfide, hydrogen, nitrogen, and methane.

10. The process of claim 5, wherein the gaseous mixture is natural gas comprising methane.

11. A solvent for removing acid gases from a gaseous mixture consisting of: N-Aminoethylpiperazine that is about 32 wt, N-Aminoethylpiperazine (AEP) that is between about 8 wt. %, thiodiglycol that is between about 20% wt. %, a K2C03 buffer, wherein the buffer is about 0.2 wt. %, and the solvent containing less than about 60 wt. % by weight of water, wherein the solvent is in a single liquid phase and the solvent has a viscosity of less than 11 cP at 40.degree. C. in the presence of a CO2 concentration less than 2.2M.

12. The solvent of claim 11 which has viscosity between 7 and 9 cP at 40 C in the absence of CO2 concentration.

13. The solvent of claim 11, which has a viscosity between 10 cP and 11 cP at 40.degree. C. in the presence of than 2.5M CO2.

* * * * *